June 22, 1954 — E. A. NEUGASS — 2,681,524
ILLUMINATED PANEL
Filed Oct. 5, 1951 — 2 Sheets-Sheet 1
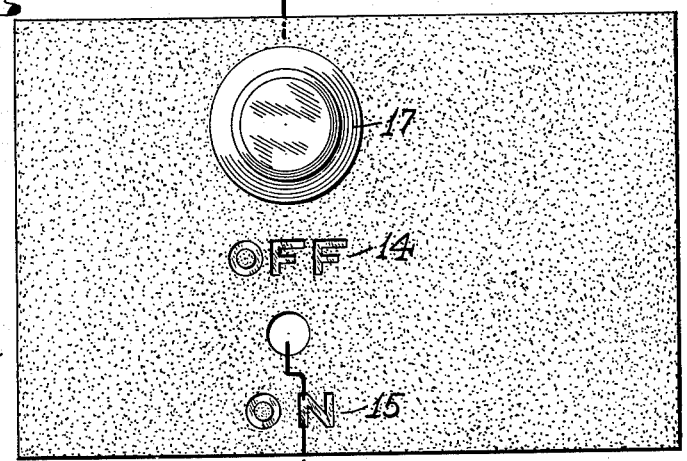
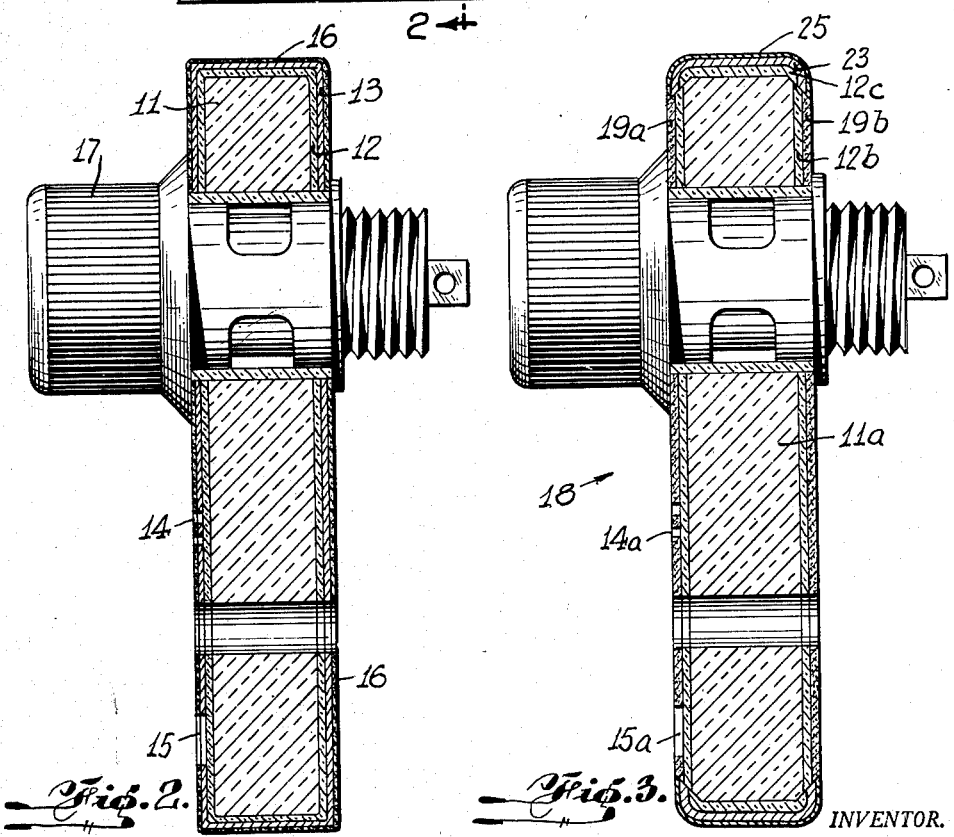
INVENTOR.
EDWIN A. NEUGASS.
ATTORNEY.

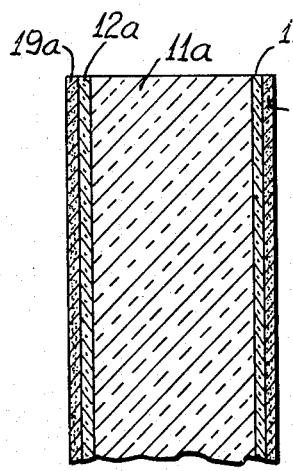
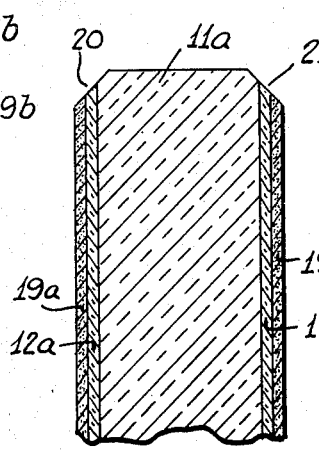
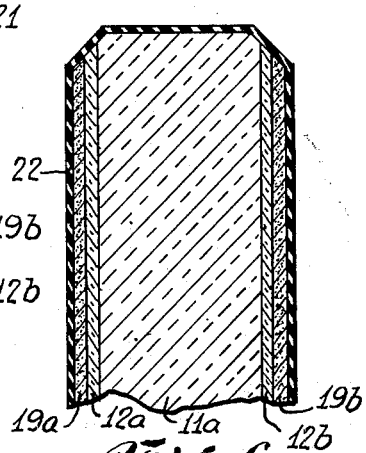
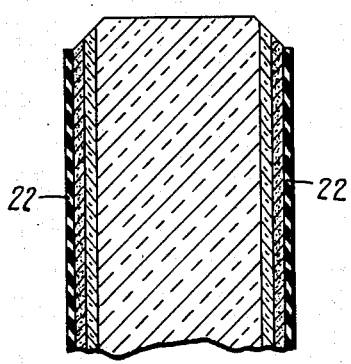
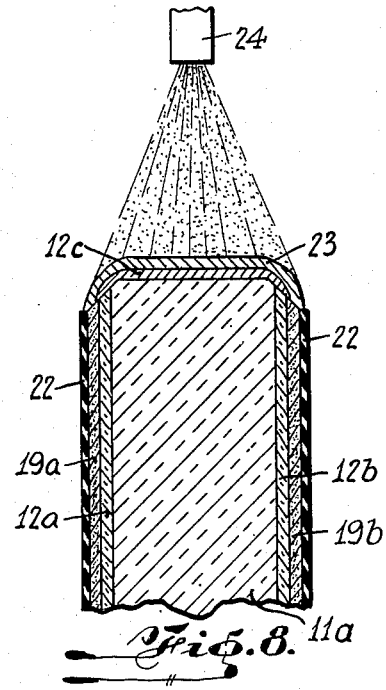
INVENTOR.
EDWIN A. NEUGASS

Patented June 22, 1954

2,681,524

UNITED STATES PATENT OFFICE 2,681,524

ILLUMINATED PANEL

Edwin A. Neugass, White Plains, N. Y.

Application October 5, 1951, Serial No. 249,870

2 Claims. (Cl. 40—130)

The present invention relates to improvements in illuminated panels, and particularly to panels for aircraft instruments and controls.

It is necessary that the illumination of all instruments, control knobs, handles, identifying numerals or lettering and the like located on the panels in the control or operating area of a conveyance, such as, for example, the cockpit of an airplane or the bridge or wheel house of a ship, be of a red color to maintain the dark adaptation of the pilot's or operator's eyes. This requirement is set forth in the United States Air Force-Navy Aeronautical Specifications, which further require that there be a high degree of color contrast between the panels bearing the instruments and controls and the lettering adorning the panels so that the lettering will be clearly defined when viewed in daylight and that the panels have low specular gloss so that the panel will not reflect ambient light in a manner to produce glare interfering with viewing the lettering.

Panels satisfying these requirements have been provided in United States Patent No. 2,518,726 wherein the panel consists of five layers of material, with the center layer or core being transparent, the next two adjacent layers translucent and superimposed directly upon the transparent layer or core at the opposite sides thereof, and the front and back outer layers are opaque and superimposed directly upon the translucent layer. The indicia on the panel are there provided by suitably shaped openings formed through the front opaque layer and extending to the underlying layer of translucent material, and a light, having a suitable red color filter, is provided for directing light through the central transparent layer or core to the translucent layer to transilluminate the latter at the indicia defining openings in the opaque layer. In order to provide the necessary sharp color contrast between the indicia and the panel, when viewed in daylight, the outer opaque layer, having the openings, is preferably black, while the translucent layers are light colored or white. The low specular gloss for reducing glare off the front face of the panel is achieved by giving the opaque outer layers a matte finish.

It is apparent that any chipping or other penetration of the opaque outer layers, particularly of the front outer layer having the indicia defining openings formed therethrough, will cause unwanted areas of the panel to pass light when the panel is internally illuminated. While such chipping may be deterred at the flat or planar face of the panel by forming the outer, black opaque layers of abrasion-resistant vinyl which is laminated, by means of heat and pressure, into a sandwich with the interposed layers of translucent and transparent material, such outer layers are not effective in resisting the undesirable penetration when subjected to blows from sharp objects, such as, tools and the like, and further fail to provide protection at the edges of the panel which are usually exposed and likely to be scratched or chipped.

It is therefore an object of the present invention to provide an internally illuminated panel of the described character which is constructed to prevent chipping or other undesired penetration of the opaque outer layer thereof.

Another object resides in the provision of an internally illuminated panel of the described character wherein the outer opaque layer, particularly at the edges of the panel, includes a metallic layer which prevents chipping or scratching such as would expose the underlying translucent layer in areas other than those defining lettering or other indicia.

Another object resides in providing a panel of the described character which is formed of a transparent body or core having layers of translucent material covering the opposite sides thereof, and an outer layer of opaque, dark or black surfaced material which is metallic at least at the edges of the panel and is formed with indicia defining openings exposing selected areas of the translucent layer so that the metallic layer or part thereof prevents chipping of the opaque outer layer and unwanted exposure of the translucent layer.

Another object of the present invention is to provide panels of the described character wherein the metallic outer layers or metallic portions of the outer layers are preferably formed of aluminum applied by hot spraying or electro-plating and the black or dark colored surface thereof is provided by anodizing the aluminum.

Another object resides in providing a panel of the described character wherein the necessary low specular gloss of the outer layer is achieved by giving a matte finish in the form of a stippled surface to the metallic layer.

Still another object of the present invention is to provide a method of producing panels of the described character wherein the metallic outer layer is applied to those areas of the panel most often subjected to impacts and abrasion.

The above and other objects, features and advantages of the present invention will be apparent in the following detailed description of illustrative embodiments thereof, when the description is read in connection with the accompanying drawings forming a part hereof.

The invention consists in such novel features, arrangements and combinations of the parts of the illustrative panels, and the method of producing the same, in connection with the embodiments herein disclosed by way of example only and as illustrative of preferred embodiments.

In the drawing:

Fig. 1 is a front plan view of a panel embodying the present invention;

Fig. 2 is a vertical sectional view taken along the line 2—2 of Fig. 1;

Fig. 3 is a vertical sectional view, similar to Fig. 2, but showing a panel constructed according to another embodiment of the present invention;

Fig. 4 is a fragmentary, vertical sectional view of the top edge portion of a preliminary sandwich or lamination formed during an initial step in producing the panel of Fig. 3 according to a method embodying the present invention;

Fig. 5 is a fragmentary, vertical sectional view, similar to Fig. 4, but showing the lamination after the performance of a subsequent step of the method;

Fig. 6 is a fragmentary, vertical sectional view, similar to Fig. 5, but showing the lamination after the next step or operation of the method;

Fig. 7 is a fragmentary, vertical sectional view similar to Fig. 6, but showing the panel at a later stage of its production; and Fig. 8 is a fragmentary, vertical sectional view similar to Fig. 7, but showing the panel in a semi-finished condition.

Referring to the drawings in detail, and initially to Figs. 1 and 2 thereof, a panel 10 is there shown to include a relatively thick sheet, core or body 11 of clear, light-transmitting material, preferably plastic, such as, for example, methyl methacrylate, and an intermediate, relatively thin lamination, coating or film 12 of flexible translucent material, preferably of the class of polyvinyl or vinyl resins or materials, their polymers or copolymers, such as, for example, polyvinyl chloride using suitable plasticizers for flexibility or blended with nitrile rubbers for the same purpose, vinyl chloride-acetate copolymers, polyvinylidene chloride, or vinyl chloride-vinylidene chloride copolymers. An outer opaque layer or coating 13 covers the translucent layer 12 and, in accordance with the present invention, is formed of a metal to resist abrasion or chipping.

Areas of the metal layer 13 are formed with suitably shaped openings, as at 14 and 15, defining desired indicia or lettering and exposing the underlying portions of the translucent layer 12. In order to provide the necessary sharp color contrast between the exposed parts of the translucent layer 12 and the surrounding areas of the metal layer 13, the layer 12 is preferably white and the outer surface of the layer 13 is dark colored and preferably black.

In a preferred embodiment of the invention, the metal layer 13 is formed of aluminum which is applied to the underlying white translucent layer 12 by the known process of hot spraying or "metallizing," with the outer surface of the aluminum layer being anodized black, as at 16, to provide the desired color contrast. While the preferred embodiment has the outer opaque layer thereof formed of aluminum anodized black, this layer, if desired, may be formed of other metals, such as, copper or zinc, and may be applied either by the above mentioned process of hot spraying or by electro-plating after the surface of the translucent layer has been suitably sensitized in a conventional manner. In cases where metals other than aluminum are utilized for the outer layer 13, the black outer surface of the latter may be provided by applying a coat or film of black opaque paint.

The openings 14 and 15 in the metal layer 13 may be created by etching away the latter either electrically or by the use of acid, or by preventing the deposit of the metal layer on the areas of the translucent layer 12 corresponding to the openings as with a stencil or by applying wax or other stop coating to such areas, when the metal layer is applied by electro-plating.

Since the outer surface of the metal layer 13, whether it is applied by spraying or by electro-plating, will be stippled or rough, the face of the panel will have a matte finish of low specular gloss to prevent reflection of ambient light in a manner to produce glare. The matte finish may be further enhanced, particularly when the metal layer is applied by electro-plating, by sandblasting the surface of the metal layer.

The panel 10 is completed by a light emitting fixture 17 of conventional construction, such as, for example, a panel light manufactured by Grimes Mfg. Co., of Urbana, Ohio, under part No. A4295, and therefore not described in detail. The fixture 17 is adapted to emit light into the transparent core or body 11 of the panel, and has either a red bulb or filter incorporated therein so that the light transmitted by the core 11 will be red colored. The red light transmitted by the core 11, when the fixture 17 is illuminated, serves to transilluminate the translucent layer 13 at the portions of the latter disposed at the inner ends of the openings 14 and 15 formed in the opaque metal layer 13 and defining the indicia or lettering of the panel. When the fixture 17 is extinguished and the panel is viewed under ambient light the sharp color contrast between the white translucent layer 12 and the black surfaced metal layer 13 will clearly define the indicia or lettering corresponding to the openings 14 and 15.

Since the outer opaque layer 13 is formed of a metal, this layer will resist chipping and wear due to abrasion so that unwanted penetration of the layer 13 will be prevented and no leakage of light will occur through the opaque outer layer to confuse the reading of the lettering or indicia.

Referring now to Fig. 3, a panel 18 is there shown in section and is formed according to another embodiment of the present invention. The panel 18 is similar to the panel 10, described above, with the exception that only portions of the opaque outer layer, preferably the edges thereof, are formed of metal, so that the superior resistance of the metal to chipping and abrasion is utilized at those areas of the panel most often subject to such attack.

In forming the panel 18, the method described below has been found to be most suitable and advantageous. First a lamination or sandwich (Fig. 4) is formed of a relatively thick central sheet or core 11a, for which the materials specified in connection with the core 11 are suitable, two relatively thin sheets 12a and 12b of translucent material at the opposite sides of the core 11a and formed of any of the materials specified in the description of layer 12, and two outer, relatively thin layers 19a and 19b of opaque flexible material, preferably formed of the class of polyvinyl or vinyl resins or materials, their polymers or copolymers, such as, for example, any of those mentioned above in connection with the layer 12 of panel 10, and having a matte finish on their outer surfaces.

The lamination of the layers 11a, 12a, 12b, 19a and 19b may be performed by coating the confronting faces of the layers with an adhesive, and then passing the superposed layers through a set of rolls to squeeze out the excess adhesive, disperse it uniformly over the entire area, and to apply pressure for bonding the layers together. As alternatives, the layers may be bonded together by employing heat and pressure, or the translucent and opaque layers may be sprayed or brushed on in the form of a paint.

After the lamination is formed as above, the resulting sandwich is cut to the size and shape of the desired panel, and the front and rear edges of the ends thereof are preferably bevelled, as at 20 and 21 (Fig. 5). A removable masking layer 22 (Fig. 6), formed of an emulsion of latex, is then sprayed or otherwise applied to completely surround the sandwich. After the masking layer 22 has dried, the portions thereof covering the ends of the sandwich are removed to expose the end edges of the layers 11a, 12a, 12b, 19a and 19b as in Fig. 7. The exposed end edges are next coated with a layer 12c of white reflecting material, such as, white paint brushed or sprayed thereon. The white coated end edges are then covered by an edging layer 23 (Fig. 8) of metal, which may be hot sprayed thereon from a heated nozzle 24 or applied by electro-plating after the plastic materials have been suitably sensitized. In the preferred embodiment, the metal edging 23 is formed of aluminum, anodized black as at 25 (Fig. 3), however, other metals, such as, copper or zinc, may be employed with the black outer surface being provided by a coating or film of black opaque paint. Finally, the masking layer 12 is stripped from the front and back of the panel and the latter is suitably engraved as at 14a and 15a to define the desired indicia or lettering and otherwise machined to accommodate the lighting fixtures and the controls, instruments or other devices to be mounted thereon.

The panel 18 thus formed, resists chipping or abrasion at the edges, where such deterioration is most likely to occur and yet minimizes the extent of the areas that are metal coated to effect a saving in the cost thereof. It is to be understood that, while the panel 18 has the metal layer 23 only at the edges thereof, other areas thereof which are subjected to extreme wear by reason of their exposed location may be similarly coated with the metal in place of the opaque layers 19a or 19b.

While I have described and illustrated specific embodiments of my invention, by way of example, it is to be understood that the invention is not limited to these precise embodiments, and that many changes and modifications, obvious to one skilled in the art, may be made therein without departing from the scope or spirit of the invention as defined in the appended claims.

What I claim is:

1. An internally illuminated device comprising a core of transparent material with a next adjacent layer of translucent material superimposed thereon, and an outer opaque layer formed at least in part of aluminum anodized black and superimposed directly on said translucent layer, said outer layer having an indicia defining opening therethrough covered at its inner end by said layer of translucent material, said device having means for admitting light to said transparent core to transilluminate the translucent layer at said opening in the opaque layer, and said translucent layer being white to provide a sharp color contrast at said opening as against the anodized black of said outer layer when the indicia is viewed under ambient light.

2. An internally illuminated panel comprising five layers of material, the center layer of which is transparent, the two next adjacent layers of which are translucent and superimposed directly upon the transparent layer at the opposite sides thereof, and the outer layers of which are opaque and formed at least in part of aluminum superimposed directly upon said translucent layers, the front one of said outer layers having openings formed therein in the shape of indicia to expose the translucent layer thereunder, and means for directing light through said transparent layer to the translucent layer to transilluminate the latter at the openings in the front opaque layer, said outer layers having black outer surfaces which, at said aluminum parts thereof, are provided by anodizing the aluminum of said parts, and said translucent layers being white to provide a sharp color contrast at said openings when the indicia are viewed under ambient light.

References Cited in the file of this patent

UNITED STATES PATENTS

| Number | Name | Date |
|---|---|---|
| 1,988,012 | Mason | Jan. 15, 1935 |
| 2,308,844 | Wilshusen | Jan. 19, 1943 |
| 2,354,857 | Gits | Aug. 1, 1944 |
| 2,518,726 | Schlenker | Aug. 15, 1950 |

FOREIGN PATENTS

| Number | Country | Date |
|---|---|---|
| 313,852 | Great Britain | Sept. 17, 1930 |